Oct. 17, 1933.    E. V. TAYLOR    1,930,699
BRAKE
Filed May 22, 1930
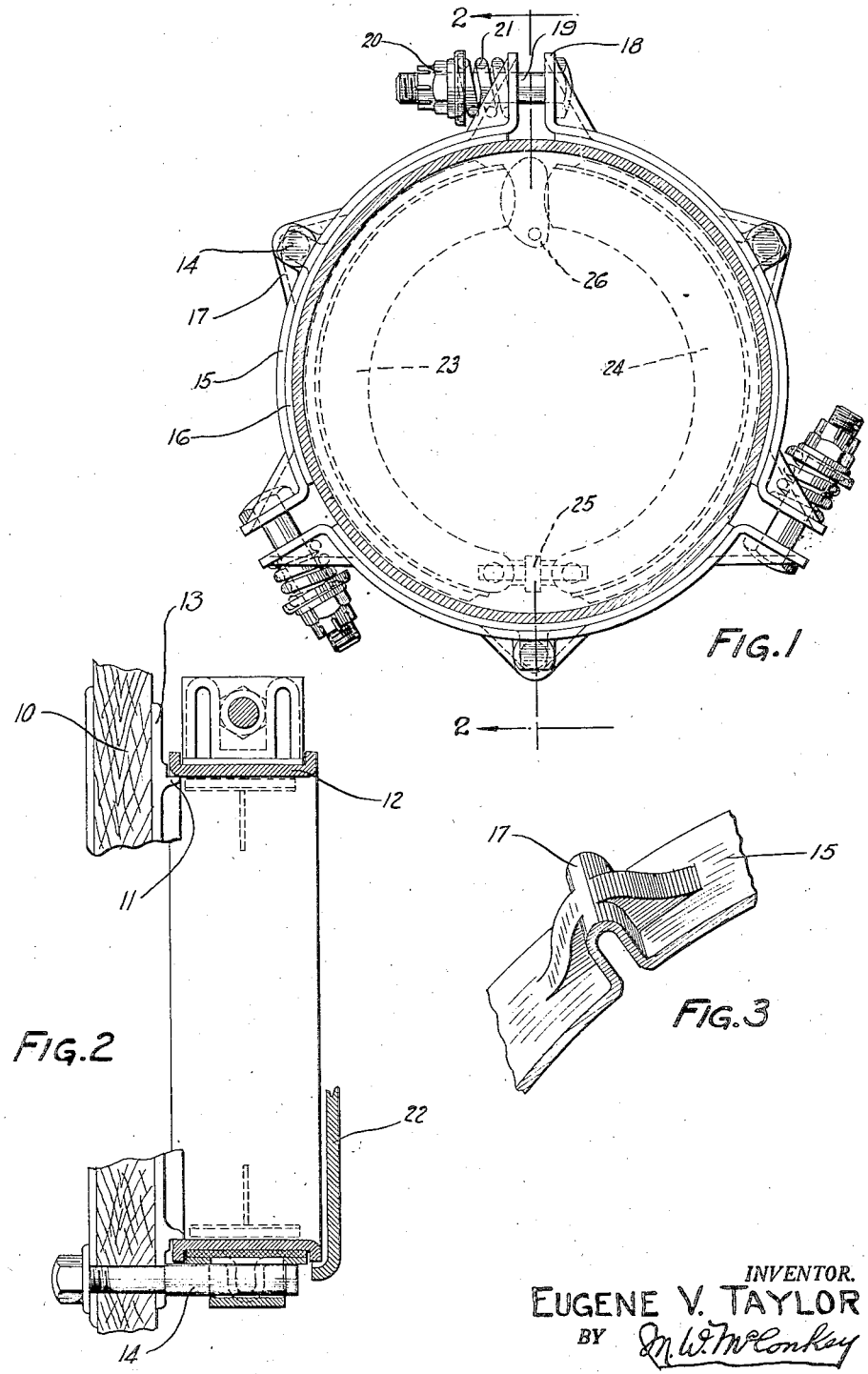
INVENTOR.
EUGENE V. TAYLOR
BY N. W. McConkey
ATTORNEY Patented Oct. 17, 1933

1,930,699

UNITED STATES PATENT OFFICE 1,930,699

BRAKE

Eugene V. Taylor, Chicago, Ill., assignor to Bendix Brake Company, South Bend, Ind., a corporation of Illinois Application May 22, 1930. Serial No. 454,552

7 Claims. (Cl. 188—218)

This invention relates to brakes and more particularly to brakes for motor vehicles.

It has been found that motor vehicle brakes now in general use frequently, upon application, lock the wheels and cause the vehicle to slide, resulting in serious injury to the tires. This is due to excessive application of the brakes and, to a great extent, is dependent upon the operator of the vehicle. It is the aim of the present invention to eliminate the locking of the wheels of a motor vehicle upon application of the brakes.

An object of the invention is to provide means for eliminating the locking of the wheels of a vehicle against rotation upon application of the brakes.

Another object of the invention is to provide means for regulating the applied pressure of a brake for a motor vehicle, so that locking of the wheels thereof is avoided.

A further object of the invention is to provide means controlling the effectiveness of the friction elements of a brake, so that a predetermined braking effect may be attained, such braking effect being of less capacity than the frictional engagement of the wheels with the ground.

An important feature of the invention is a drum positioned on the wheel for rotation relative thereto and friction means carried by the wheel for engagement with the drum.

Another important feature of the invention is a drum positioned on the wheel and rotatable relative thereto and friction means carried by the wheel engaging the drum having means for predetermining the pressure applied by the friction means.

Yet another important feature of the invention is a drum supported for rotation on a wheel and friction means carried by the wheel engaging the drum, the friction means being yieldingly held in engagement with the drum.

Other objects of the invention will appear from the following description taken in connection with the drawing, which forms a part of this specification, and in which:

Figure 1 is a vertical sectional view through the drum illustrating the invention as applied;

Figure 2 is a section substantially on line 2—2 Figure 1; and

Figure 3 is a perspective view of a portion of one of the friction elements.

Referring to the drawing for more specific details of the invention, 10 represents a motor vehicle wheel which may be of any preferred type. Positioned on the wheel is an annular shouldered flange 11 on which is supported for rotation a drum 12. As shown, the annular shouldered flange is formed on a plate 13 bolted or otherwise secured to the wheel. It is, however, to be understood that this flange may be formed on the disk of a wheel or otherwise provided.

Arranged on the wheel in spaced relation with respect to each other is a plurality of studs 14. These studs support friction elements 15 having secured thereto a suitable lining 16 engaging the drum 12. The friction elements 15 each comprise a segment having formed substantially midway of its ends a sleeve 17 adaptable for the reception of one of the studs 14. The respective ends of each segment is bent to provide an ear 18, and these ears are apertured to receive bolts 19 by which the several segments are secured together. The bolts 19 have positioned thereon intermediate one of the ears and a nut 20 threaded on the bolt, a coil spring 21, so that tension between the various segments may be regulated to apply the friction elements to the drum with a predetermined pressure.

Associated with the drum is a fixed support, such as a backing plate 22. This support has positioned thereon for movement conventional friction elements 23 and 24 adaptable for engagement with the drum. These friction elements are connected at their articulated ends by an adjusting device 25 and positioned between their separable ends is an operating member 26. Any other suitable friction means controlled by an operator may be employed.

In operation, the friction elements 23 and 24 are actuated to apply the brakes, and in instances where the friction elements 23 and 24 are applied with excessive pressure tending to lock the friction elements to the drum, the wheel rotates relative to the drum, and since the wheel carries the friction elements 15, these elements operate to retard the rotation of the wheel.

The force applied between the friction elements 15 and the drum is regulated through the tension of the springs 21 to a degree slightly below the frictional engagement of the wheels with the ground, so that the rotation of the wheels is not entirely prevented and hence sliding of the wheel and the resulting injury to the tires carried thereby is avoided.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A brake comprising a rotatable member, a drum yieldingly supported thereon by interconnected band sections and friction means cooperating with the drum.

2. A brake comprising a rotatable member, a drum rotatable relative thereto, means carried by the rotatable member for supporting the drum including band sections yieldingly connected, a fixed support and a member on the fixed support frictionally engaging the drum.

3. A brake comprising a rotatable member, a drum rotatable relative thereto, means on the rotatable member supporting the drum including yieldingly connected members embracing the drum, a fixed support and friction means between the fixed support and rotatable member.

4. A brake comprising a rotatable member, a drum positioned thereon and adaptable for rotation relative thereto, a plurality of friction members carried by the rotatable member arranged end to end around the drum and yieldingly connected, a fixed support, friction elements positioned on the fixed support and means actuating the friction elements on the fixed support for engagement with the drum.

5. A brake comprising a rotatable member, a drum carried thereby adaptable for rotation relative thereto, a plurality of friction members carried by the rotatable member surrounding the drum and yieldingly connected to each other, a fixed support and friction elements on the fixed support adaptable for engagement with the drum.

6. A brake comprising a rotatable member, a drum positioned thereon adaptable for rotation relative thereto, a plurality of segmental friction members carried by the rotatable member engaging the periphery of the drum, means yieldingly connecting the friction members, a fixed support and friction elements positioned for movement on the fixed support adaptable for engagement with the inner periphery of the drum.

7. A brake comprising a rotatable member, a drum positioned thereon for rotation relative thereto, a plurality of friction members carried by the rotatable member arranged end to end on the periphery of the drum, means connecting the adjacent ends of the friction members for predetermining resistance to drum rotation, a fixed support, friction elements positioned for movement on the fixed support and means for actuating the friction elements for engagement with the inner periphery of the drum.

EUGENE V. TAYLOR.